United States Patent
Gonze et al.

(10) Patent No.: US 8,037,673 B2
(45) Date of Patent: Oct. 18, 2011

(54) SELECTIVE CATALYST REDUCTION LIGHT-OFF STRATEGY

(75) Inventors: Eugene V. Gonze, Pinckney, MI (US); Michael J. Paratore, Jr., Howell, MI (US)

(73) Assignee: GM Global Technology Operations LLC

( * ) Notice: Subject to any disclaimer, the term of this patent is extended or adjusted under 35 U.S.C. 154(b) by 963 days.

(21) Appl. No.: 11/946,256

(22) Filed: Nov. 28, 2007

(65) Prior Publication Data
US 2008/0307774 A1   Dec. 18, 2008

Related U.S. Application Data

(60) Provisional application No. 60/936,098, filed on Jun. 18, 2007.

(51) Int. Cl.
*F01N 3/00* (2006.01)

(52) U.S. Cl. ............... 60/284; 60/274; 60/286; 60/295; 60/300; 60/301; 60/303

(58) Field of Classification Search ............. 60/274, 60/286, 295, 297, 300, 303, 311, 284, 301
See application file for complete search history.

(56) References Cited

U.S. PATENT DOCUMENTS

| | | | |
|---|---|---|---|
| 4,359,862 A * | 11/1982 | Virk et al. | 60/274 |
| 4,505,726 A | 3/1985 | Takeuchi | |
| 4,516,993 A | 5/1985 | Takeuchi | |
| 5,711,149 A * | 1/1998 | Araki | 60/278 |
| 5,846,276 A * | 12/1998 | Nagai et al. | 55/523 |
| 6,090,172 A * | 7/2000 | Dementhon et al. | 55/282.3 |
| 6,304,815 B1 * | 10/2001 | Moraal et al. | 701/115 |
| 6,594,990 B2 * | 7/2003 | Kuenstler et al. | 60/295 |
| 7,073,326 B2 * | 7/2006 | Cheong | 60/295 |
| 7,104,051 B2 * | 9/2006 | Shimasaki et al. | 60/297 |
| 7,412,822 B2 * | 8/2008 | Zhan et al. | 60/295 |
| 7,550,119 B2 * | 6/2009 | Kojima | 422/180 |

FOREIGN PATENT DOCUMENTS

| | | |
|---|---|---|
| DE | 19926138 A1 | 12/2000 |
| DE | 102007006625 | 8/2008 |

* cited by examiner

*Primary Examiner* — Tu Nguyen

(57) ABSTRACT

An emissions control system includes a temperature determination module and an emissions control module. The temperature determination module determines a first temperature of a heater element of a diesel particulate filter (DPF) assembly in an exhaust system and determines a second temperature of a catalyst of the DPF assembly. The emissions control module selectively activates the heater element, selectively initiates a predefined combustion process in an engine based upon the first temperature, and selectively starts a reductant injection process based upon the second temperature.

23 Claims, 5 Drawing Sheets

SELECTIVE CATALYST REDUCTION LIGHT-OFF STRATEGY

CROSS-REFERENCE TO RELATED APPLICATIONS

This application claims the benefit of U.S. Provisional Application No. 60/936,098, filed on Jun. 18, 2007. The disclosure of the above application is incorporated herein by reference in its entirety.

STATEMENT OF GOVERNMENT RIGHTS

This invention was produced pursuant to the U.S. Government Contract No. DE-FC-04-03 AL67635 with the Department of Energy (DOE). The U.S. Government has certain rights in this invention.

FIELD

The present disclosure relates to vehicle emissions and more particularly to selective catalyst reduction.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Diesel engines typically produce torque more efficiently than gasoline engines. This increase in efficiency may be due to an increased compression ratio and/or the combustion of diesel fuel, which has a higher energy density than that of gasoline. The combustion of diesel fuel produces particulate. The particulate is filtered from exhaust by a diesel particulate filter (DPF). With time, the DPF may fill with particulate, thereby restricting the flow of the exhaust. The particulate may be combusted by a process referred to as regeneration.

Regeneration may be accomplished, for example, by injecting fuel into the exhaust stream after the combustion of the diesel fuel. One or more catalysts may be disposed in the exhaust stream and may combust the injected fuel. The combustion of the fuel by the catalysts generates heat, thereby increasing the temperature of the exhaust. The increased temperature of the exhaust may burn the remainder of the particulate trapped in the DPF.

SUMMARY

An emissions control system comprises a temperature determination module and an emissions control module. The temperature determination module determines a first temperature of a heater element of a diesel particulate filter (DPF) assembly in an exhaust system and determines a second temperature of a catalyst of the DPF assembly. The emissions control module selectively activates the heater element, selectively initiates a predefined combustion process in an engine based upon the first temperature, and selectively starts a reductant injection process based upon the second temperature.

In further features, the heater element includes a plurality of zones. The emissions control system further comprises a heater control module. The heater module repeatedly activates selected ones of the zones of the heater element in a predefined order. The emissions control module activates the heater element after starting the engine. The emissions control module initiates the predefined combustion process when the first temperature is greater than a first temperature threshold.

In other features, the engine provides unburned fuel to the exhaust system during the predefined combustion process. The temperature determination module estimates the second temperature based upon heating resulting from combustion of the unburned fuel. The temperature determination module determines a third temperature of a substrate of the DPF assembly and estimates the second temperature based upon the third temperature.

In still further features, the temperature determination module estimates the first temperature based upon power delivered to the heater element. The emissions control module starts the reduction injection process when the second temperature is greater than a second temperature threshold. The emissions control module deactivates the heater element after the predefined combustion process is initiated. The emissions control system further comprises an injector that injects reductant into the exhaust system once the reduction injection process is started.

A method comprises determining a first temperature of a heater element of a diesel particulate filter (DPF) assembly in an exhaust system, determining a second temperature of a catalyst of the DPF assembly, selectively activating the heater element, selectively initiating a predefined combustion process in an engine based upon the first temperature, and selectively starting a reductant injection process based upon the second temperature.

In other features, the method further comprises repeatedly activating selected zones of the heater element in a predefined order. The method further comprises activating the heater element after starting the engine. The method further comprises initiating the predefined combustion process when the first temperature is greater than a first temperature threshold.

In further features, the method further comprises providing unburned fuel to the exhaust system during the predefined combustion process. The method further comprises estimating the second temperature based upon heating resulting from combustion of the unburned fuel. The method further comprises determining a third temperature of a substrate of the DPF assembly and estimating the second temperature based upon the third temperature.

In still further features, the method further comprises estimating the first temperature based upon power delivered to the heater element. The method further comprises starting the reduction injection process when the second temperature is greater than a second temperature threshold. The method further comprises deactivating the heater element after the predefined combustion process is initiated. The method further comprises injecting reductant into the exhaust system once the reduction injection process is started.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
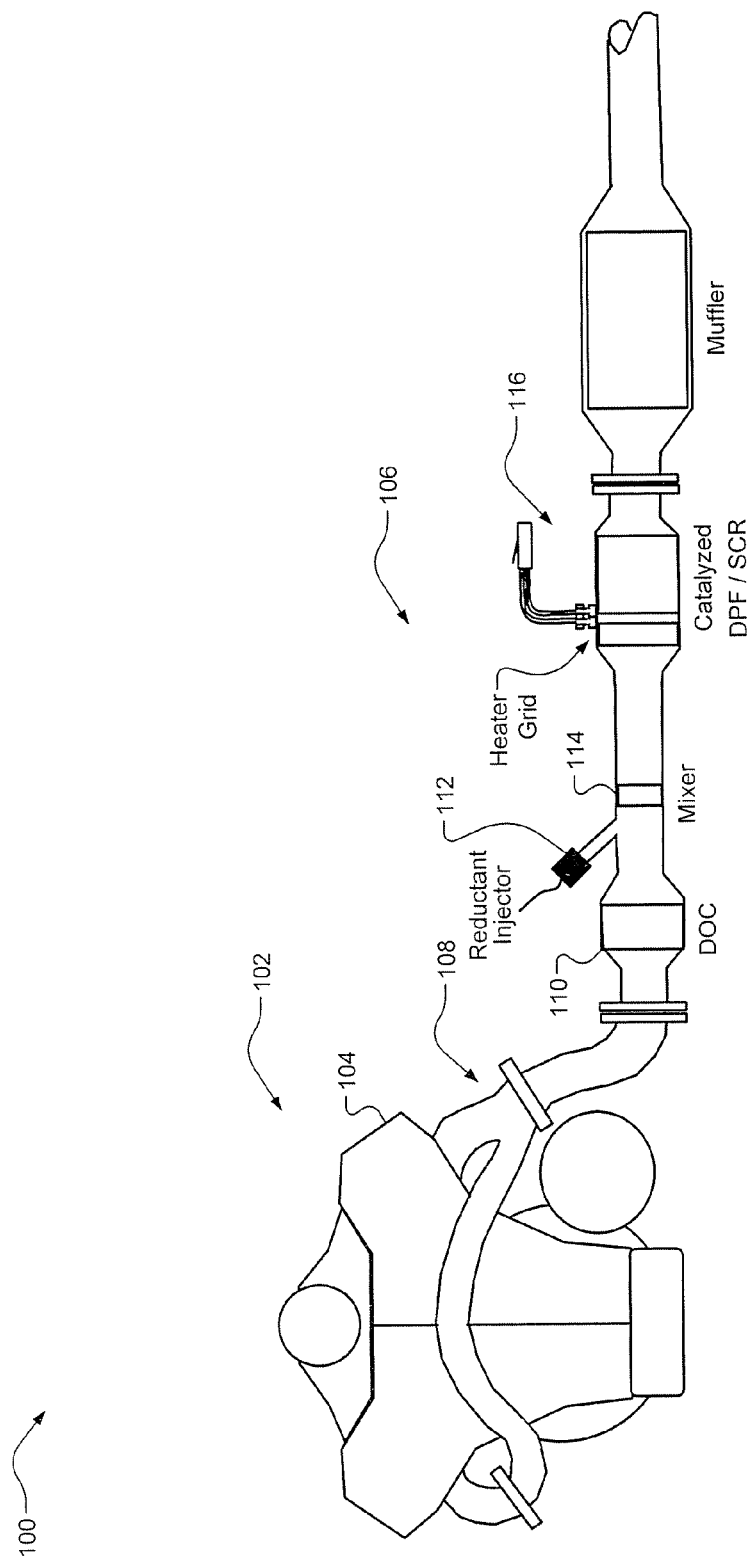
FIG. 1 is a functional block diagram of an exemplary vehicle according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a functional block diagram of an exemplary vehicle 100 is presented. The vehicle 100 includes a diesel engine system 102. The diesel engine system 102 is described for example only and the principles of the present disclosure may be implemented in other types of engine systems. For example, the principles of the present disclosure may be applied to a gasoline engine system and/or a homogenous charge compression ignition engine system.

The diesel engine system 102 includes an engine 104 that combusts a mixture of air and diesel fuel to produce torque. Resulting exhaust is expelled from the engine 104 into an exhaust system 106. The exhaust system 106 includes an exhaust manifold 108, a diesel oxidation catalyst (DOC) 110, a reductant injector 112, a mixer 114, and a diesel particulate filter (DPF) assembly 116. The exhaust system 106 may also include an exhaust gas recirculation (EGR) valve (not shown) that may recirculate a portion of the exhaust into the engine 104.

The exhaust flows from the engine 104 through the exhaust manifold 108 to the DOC 110. The DOC 110 oxidizes particulate in the exhaust as the exhaust flows through the DOC 110. For example only, the DOC 110 may oxidize particulate such as hydrocarbons and/or carbon oxides. The reductant injector 112 may inject a reductant, such as ammonia or urea, into the exhaust system. The mixer 114, which may be implemented as a baffle, agitates the exhaust and/or the injected reductant. In this manner, the mixer 114 may create a reductant-exhaust aerosol by mixing the reductant with the exhaust.

The DPF assembly 116 filters particulate from the exhaust, which may accumulate within the DPF assembly 116. Particulate matter accumulating within the DPF assembly 116 may restrict the exhaust flow through the DPF assembly 116. The particulate may be removed from the DPF assembly 116 by a process referred to as regeneration.

Figure 2:
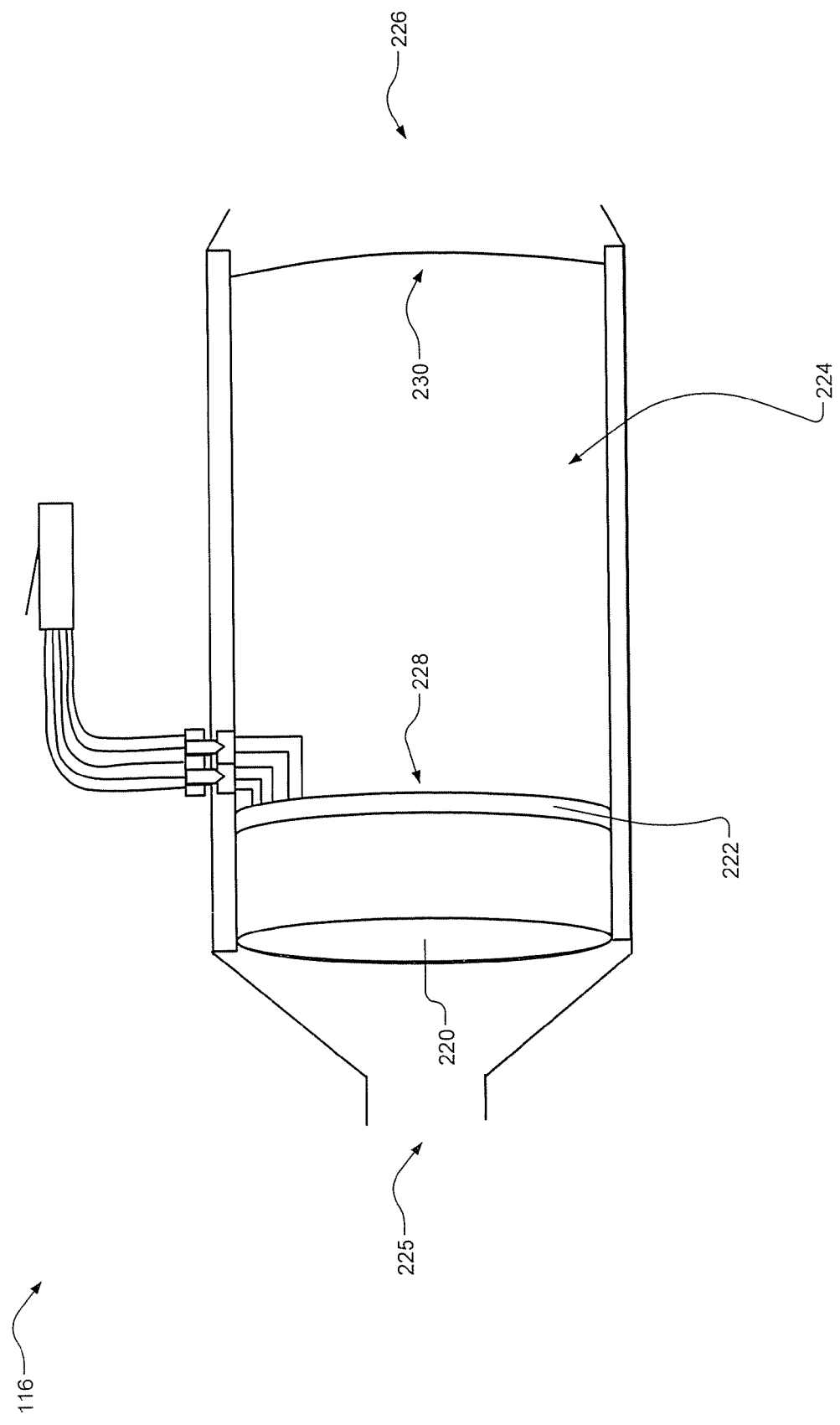
FIG. 2 is an exemplary cross sectional diagram of a diesel particulate filter assembly according to the principles of the present disclosure.

Referring now to FIG. 2, an exemplary cross-sectional diagram of the DPF assembly 116 is presented. The DPF assembly 116 includes a substrate 220, a heater element 222, and a diesel particulate filter (DPF) element 224. The exhaust enters the DPF assembly 116 through an inlet 225 and flows through the substrate 220, the heater element 222, and then the DPF element 224. The exhaust exits the DPF assembly 116 though an outlet 226.

The substrate 220 may, for example, hold the heater element 222 in contact with the DPF element 224, make the exhaust flow more laminar (i.e., straighten the direction of the exhaust flow) through the DPF element 224, and/or prevent radiant heat from being lost from the DPF assembly 116. The heater element 222 may be arranged in, for example only, a grid.

The exhaust may enter the DPF element 224 through a front section 228 of the DPF element 224, which may be in contact with or close to the heater element 222. The DPF element 224 may include, for example, alternating open and closed channels (not shown) that force the exhaust through walls (not shown) of the DPF element 224. The walls of the DPF element 224 filter particulate from the exhaust. The walls of the DPF element 224 may be porous, may be arranged in a honeycomb fashion, and may be made of, for example only, a ceramic or cordierite material. The exhaust exits the DPF element 224 through a rear section 230 of the DPF element 224.

The regeneration process may begin once the heater temperature reaches a threshold, such as 800° C. The heat generated by the combustion of particulate near the front section 228 is carried by the exhaust through the DPF element 224, thereby combusting particulate throughout the DPF element 224.

A selective catalyst reductant (SCR) catalyst is applied to all of or a portion of the DPF element 224. The SCR catalyst may be applied to, for example, the front section 228, the walls, and/or the rear section 230 of the DPF element 224. The SCR catalyst may be applied to the DPF element 224 in any pattern, such as striped, and the SCR catalyst may be applied in varying degrees. For example only, the SCR catalyst may be applied more heavily toward the rear section 230 of the DPF element 224 than the front section 228.

The SCR catalyst absorbs reductant injected by the reductant injector 112 and reacts with nitrogen oxides ($NO_X$) and/or other pollutants in the exhaust. In this manner, the SCR catalyst may reduce the $NO_X$ emissions of the vehicle 100. The SCR catalyst may be effective in reducing (reacting with) $NO_X$ once the temperature of the SCR catalyst exceeds a threshold. For example only, the threshold, referred to as $T_{SCR}$, may be 200° C. If the reductant is injected when the SCR temperature is below $T_{SCR}$, the reductant may compromise the function of the SCR catalyst.

Upon starting the engine 104, the SCR temperature is likely below the $T_{SCR}$ threshold. Accordingly, the SCR catalyst may not effectively react with $NO_X$ present in the exhaust upon starting the engine 104. Engine exhaust will eventually bring the SCR temperature to $T_{SCR}$. To shorten the time before the SCR temperature reaches $T_{SCR}$, heat can be generated by combusting fuel at the heater element 222.

To allow this, the heater element 222 may be coated with a catalyst that ignites fuel present in the exhaust when the heater element 222 reaches a threshold temperature. Accordingly, when the temperature of the heater element 222 reaches the threshold temperature, the engine 104 may be instructed to increase the amount of fuel present in the exhaust. This fuel combusts at the heater element 222 and heats the SCR catalyst.

Figure 3:
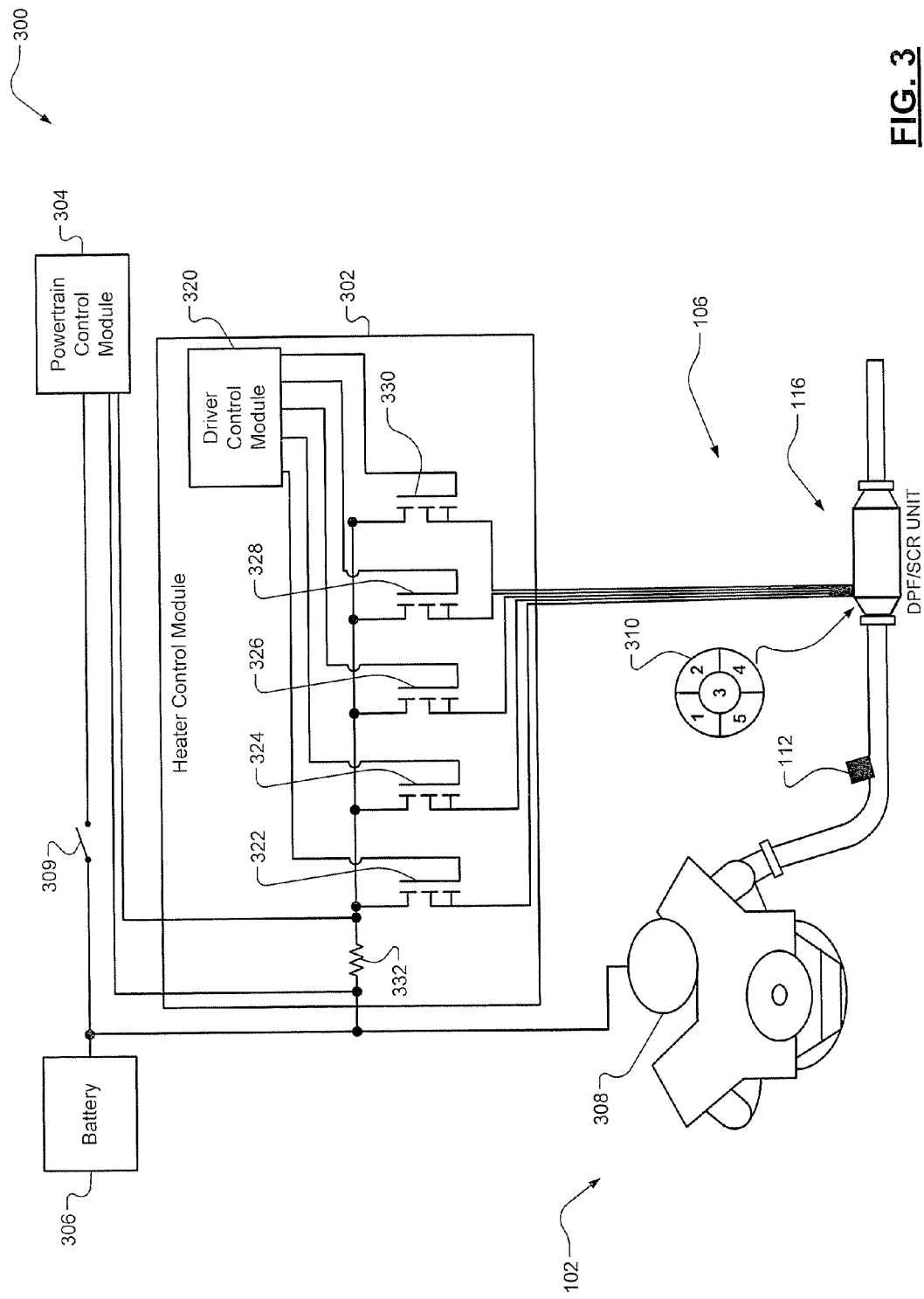
FIG. 3 is an functional block diagram of an exemplary vehicle according to the principles of the present disclosure.

Referring now to FIG. 3, a functional block diagram of an exemplary vehicle 300 is presented. The vehicle 300 includes the diesel engine system 102 and the exhaust system 106, which includes the DPF assembly 116. Power is supplied to a heater control module 302 and a powertrain control module (PCM) 304 by, for example, a battery 306 and/or a generator 308.

Power to the PCM 304 may be switched by a switch 309, which may be controlled by an ignition key. For example only, the battery 306 may supply twelve (12) Volts, and the generator 308 may supply 14.5±0.5 Volts on average. The PCM 304 may control, for example, combustion of the diesel fuel within the engine 104, actuation of the heater control module 302, and injection of the reductant by the reductant injector 112.

The heater control module 302 selectively applies power to the heater element 222 based upon a heater control signal from the PCM 304. In various implementations, the heater element 222 may have a resistance of 0.1Ω, a power rating of 2300 Watts, a voltage rating of 12 Volts, and a current rating of 192 Amps.

A resistor 332 having a known resistance value may be connected in series with the power supplied to the heater control module 302. The PCM 304 may measure a voltage at either end of the resistor 332 to determine power supply voltage for the heater control module 302. The PCM 304 may also measure the voltage drop across the resistor 332. The current supplied to the heater control module 302 can then be determined by dividing this voltage drop by the known resistance value.

The heater element 222 of the DPF assembly 116 may be divided into one or more zones. For example only, the heater element 222 may be divided into 5 zones, and the zones may be arranged in any manner, such as a zone arrangement graphically depicted at 310. The PCM 304 may instruct the heater control module 302, via the heater control signal, to apply the power to the entire heater element 222 and/or any zone or combination of zones of the heater element 222.

The heater control module 302 may include, for example, a driver control module 320 and one or more switching modules, such as switching modules 322, 324, 326, 328, and 330. The switching modules 322-330 may be, for example, transistors. More specifically, the switching modules 322-330 may be power transistors. Each of the zones of the heater element 222 may be connected to one of the switching modules 322-330 and to a return line (not shown) or a common ground (not shown).

The driver control module 320 may control the application of power to the zones of the heater element 222 by, for example, controlling the switching modules 322-330. For example only, the driver control module 320 may apply power to: a first zone of the zone arrangement 310, via the switching module 322; a second zone, via the switching module 324; a third zone, via the switching module 326; a fourth zone, via the switching module 328; and a fifth zone, via the switching module 330.

The driver control module 320 may control the switching modules 322-330 based upon the control signal from the PCM 304. The PCM 304 may, for example, instruct the driver control module 320 to apply power to each of the zones of the heater element 222 in a predefined order, such as a sequential order. For example only, the sequential order may include applying power to the first zone, then the second zone, then the third zone, then the fourth zone, then the fifth zone. The driver control module 320 may repeat applying power to the zones in this order until a corresponding instruction from the PCM 304 is received.

Figure 4:
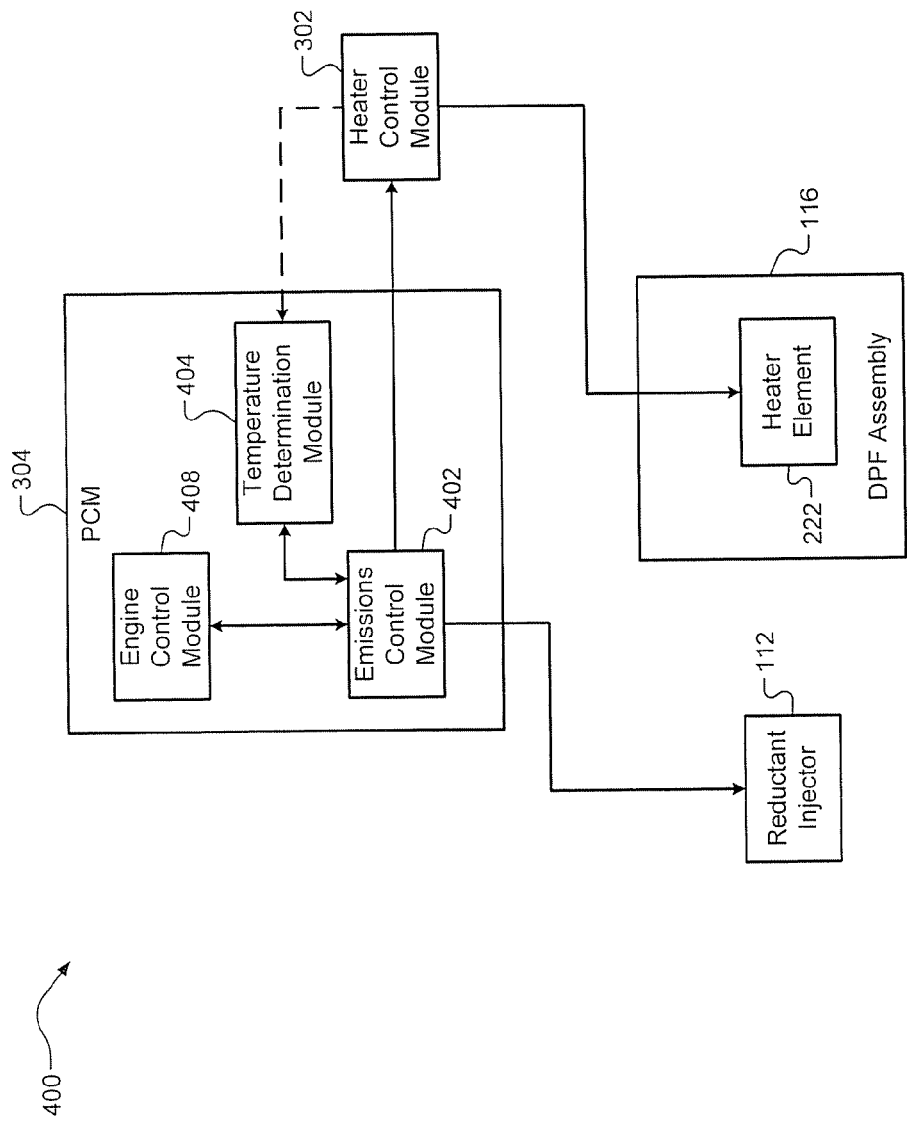
FIG. 4 is a functional block diagram of an exemplary emissions control system according to the principles of the present disclosure.

Referring now to FIG. 4, a functional block diagram of an exemplary emissions control system 400 is presented. The emissions control system 400 includes an emissions control module 402 and a temperature determination module 404. In various implementations, the emissions control module 402 and the temperature determination module 404 may be implemented in the PCM 304. The PCM 304 may also include an engine control module 408.

Upon starting the engine 104, the emissions control module 402 generates the heater control signal, which instructs the heater control module 302 to activate the heater element 222. The heater control module 302 may repeatedly activate various zones of the heater element 222. The temperature determination module 404 determines the SCR temperature and the heater temperature. Upon starting the diesel engine system 102, the temperature determination module 404 may estimate that the SCR temperature and the heater temperature are a predetermined temperature, such as an ambient temperature.

The temperature determination module 404 may determine the heater temperature based upon, for example, the power supplied to the heater control module 302. The temperature determination module 404 may measure the voltage and/or the current supplied to the heater control module 302 in order to determine the power supplied. The power provided to the heater element 222 over time can be used to estimate the temperature of the heater element 222.

The emissions control module 402 may determine that combustion may begin when the heater temperature is greater than a temperature threshold, referred to as $T_{HEATER}$. For example only, $T_{HEATER}$ may be 250° C. Once the heater temperature is greater than $T_{HEATER}$, the emissions control module 402 may generate an engine control signal.

The engine control signal instructs the engine control module 408 to activate a predefined combustion process. The predefined combustion process may provide unburned fuel to the exhaust system 106. For example, the engine control module 408 may increase the amount of fuel injected into the engine 104. In various implementations, fuel may be directly injected into the exhaust system 106.

Unburned fuel provided to the exhaust system 106 by the predefined combustion process will be combusted by the heated catalyst coating of the heater element 222. The temperature determination module 404 may estimate the temperature of the substrate 220 or the SCR catalyst based upon, for example, the duration of the predefined combustion process.

The temperature determination module 404 may determine the temperature at the substrate 220 and estimate that the SCR temperature is approximately equal to the substrate temperature. Alternatively, the temperature determination module 404 may apply a low-pass filter to the substrate temperature to determine the SCR temperature. In addition, the temperature determination module 404 may estimate that the SCR temperature is a predetermined percentage or amount less than the substrate temperature.

In addition, the temperature determination module 404 may receive temperature data from temperature sensors, which may be located near the heater element 222 and/or at other locations in the DPF assembly 116. The temperature data may be used instead of, or as a supplement to, estimation of the substrate and SCR temperatures.

The emissions control module 402 may determine that the SCR catalyst will effectively operate once the SCR temperature reaches the $T_{SCR}$ threshold. At this time, the emissions control module 402 may generate a reductant control signal, which instructs the reductant injector 112 to begin injecting reductant into the exhaust. In various implementations, the reductant injector 112 may continue injecting the reductant into the exhaust until the engine 104 is turned off.

The emissions control module 402 may also instruct the heater control module 302 to deactivate the heater element 222. In this manner, the emissions control module 402 ensures that the functionality of the SCR catalyst is not compromised by injecting reductant before the SCR temperature reaches the $T_{SCR}$ threshold.

Figure 5:
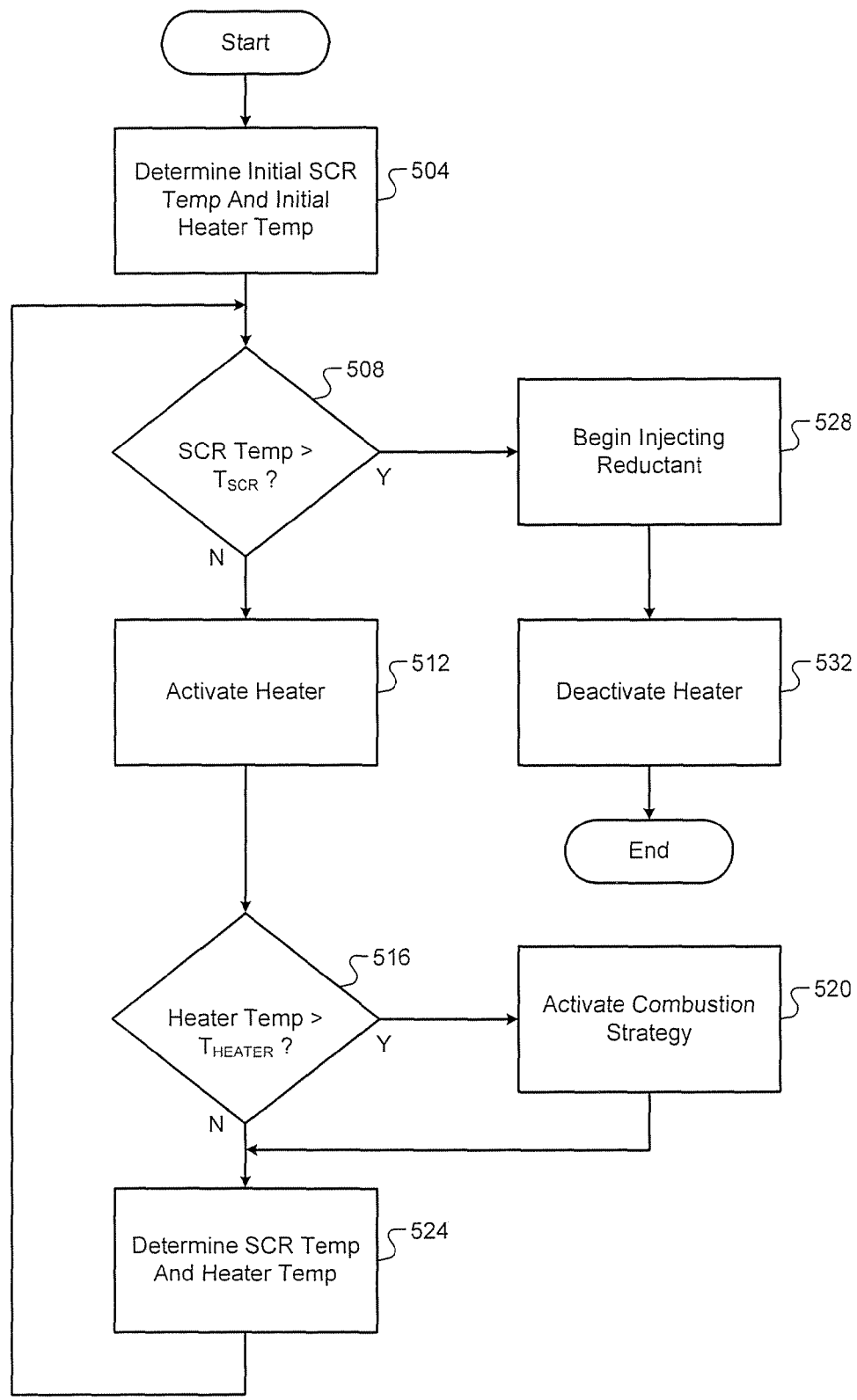
FIG. 5 is a flowchart depicting exemplary steps performed by an emissions control system according to the principles of the present disclosure.

Referring now to FIG. 5, a flowchart depicting exemplary steps performed by the emissions control module 402 are presented. Control begins upon starting the vehicle 300. In step 504, control determines the initial SCR temperature and the initial heater temperature. In various implementations, control may assume that the initial SCR temperature and the initial heater temp are equal to a predetermine temperature, such as an ambient temperature.

Control continues in step 508 where control determines whether the SCR temperature is greater than the $T_{SCR}$ threshold. If so, control transfers to step 528; otherwise control continues in step 512. In step 512, control activates the heater control module 302. In various implementations, the heater control module 302 repeatedly activates one or more zones of the heater element 222 in the sequential order.

Control then continues in step 516 where control determines whether the heater temperature is above the $T_{HEATER}$ threshold. If so, control transfers to step 520; otherwise, control continues in step 524. In step 520, control instructs the engine control module 408 to activate the predefined combustion process and control continues in step 524. The predefined combustion process may produce additional fuel in the exhaust of the engine 104. The additional fuel provided by the predefined combustion process is combusted at the heater element 222, thereby warming the SCR catalyst.

In step 524, control determines the SCR temperature and the heater temperature, and control returns to step 508. For example, control measures and/or estimates the SCR temperature and the heater temperature. In step 528, control instructs the reductant injector 112 to begin injecting the reductant into the exhaust. Control continues in step 532, where control deactivates the heater element 222 and control ends.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method comprising:
   determining a first temperature of a heater element of a diesel particulate filter (DPF) assembly in an exhaust system;
   determining a second temperature of a catalyst of said DPF assembly;
   selectively activating said heater element;
   initiating a predefined combustion process in an engine when said first temperature is greater than a first temperature threshold; and
   selectively starting a reductant injection process based upon said second temperature.

2. A method comprising:
   determining a first temperature of a heater element of a diesel particulate filter (DPF) assembly in an exhaust system;
   determining a second temperature of a selective catalytic reduction (SCR) catalyst of said DPF assembly;
   selectively activating said heater element;
   selectively initiating a predefined combustion process in an engine based upon said first temperature; and
   selectively starting a reductant injection process based upon said second temperature,
   wherein said process provides ammonia ($NH_3$) to said SCR catalyst.

3. The method of claim 2 further comprising repeatedly activating selected zones of said heater element in a predefined order.

4. The method of claim 2 further comprising activating said heater element after starting said engine.

5. The method of claim 2 further comprising:
   determining a third temperature of a substrate of said DPF assembly; and
   estimating said second temperature based upon said third temperature.

6. The method of claim 2 further comprising estimating said first temperature based upon power delivered to said heater element.

7. The method of claim 2 further comprising starting said reduction injection process when said second temperature is greater than a second temperature threshold.

8. The method of claim 2 further comprising deactivating said heater element after said predefined combustion process is initiated.

9. The method of claim 2 further comprising injecting reductant into said exhaust system once said reduction injection process is started.

10. The method of claim 2 further comprising providing unburned fuel to said exhaust system during said predefined combustion process.

11. The method of claim 10 further comprising estimating said second temperature based upon heating resulting from combustion of said unburned fuel.

12. An emissions control system comprising:
   a temperature determination module that determines a first temperature of a heater element of a diesel particulate filter (DPF) assembly in an exhaust system and that determines a second temperature of a catalyst of said DPF assembly; and
   an emissions control module that selectively activates said heater element, that selectively initiates a predefined combustion process in an engine when said first temperature is greater than a first temperature threshold, and that selectively starts a reductant injection process based upon said second temperature.

13. An emissions control system comprising:
   a temperature determination module that determines a first temperature of a heater element of a diesel particulate filter (DPF) assembly in an exhaust system and that determines a second temperature of a selective catalytic reduction (SCR) catalyst of said DPF assembly; and
   an emissions control module that selectively activates said heater element, that selectively initiates a predefined combustion process in an engine based upon said first temperature, and that selectively starts a reductant injection process based upon said second temperature,
   wherein said reductant infection process provides SCR catalyst.

14. The emissions control system of claim 13 wherein said emissions control module activates said heater element after starting said engine.

15. The emissions control system of claim 13 wherein said temperature determination module determines a third temperature of a substrate of said DPF assembly and estimates said second temperature based upon said third temperature.

16. The emissions control system of claim 13 wherein said temperature determination module estimates said first temperature based upon power delivered to said heater element.

17. The emissions control system of claim 13 wherein said emissions control module starts said reduction injection process when said second temperature is greater than a second temperature threshold.

18. The emissions control system of claim 13 wherein said emissions control module deactivates said heater element after said predefined combustion process is initiated.

19. The emissions control system of claim 13 further comprising an injector that injects reductant into said exhaust system once said reduction injection process is started.

20. The emissions control system of claim 13 wherein said heater element includes a plurality of zones.

21. The emissions control system of claim 20 further comprising a heater control module that repeatedly activates selected ones of said zones of said heater element in a predefined order.

22. The emissions control system of claim 13 wherein said engine provides unburned fuel to said exhaust system during said predefined combustion process.

23. The emissions control system of claim 22 wherein said temperature determination module estimates said second temperature based upon heating resulting from combustion of said unburned fuel.

* * * * *